United States Patent
Lin

(10) Patent No.: US 7,792,326 B2
(45) Date of Patent: Sep. 7, 2010

(54) METHOD OF TRACKING VOCAL TARGET

(75) Inventor: Chung-Yi Lin, Taipei (TW)

(73) Assignee: Compal Electronics, Inc., Taipei (TW)

( * ) Notice: Subject to any disclaimer, the term of this patent is extended or adjusted under 35 U.S.C. 154(b) by 835 days.

(21) Appl. No.: 11/690,845

(22) Filed: Mar. 25, 2007

(65) Prior Publication Data

US 2008/0013786 A1    Jan. 17, 2008

(30) Foreign Application Priority Data

Jul. 11, 2006    (TW) ............................... 95125201 A

(51) Int. Cl.
*G06K 9/00* (2006.01)
(52) U.S. Cl. .................. 382/103; 348/14.1; 348/14.6
(58) Field of Classification Search ............... 382/103; 348/14.1, 14.6
See application file for complete search history.

(56) References Cited

U.S. PATENT DOCUMENTS

| 6,275,258 | B1 * | 8/2001 | Chim ................. 348/211.12 |
| 2004/0240652 | A1 * | 12/2004 | Kanada ................. 379/201.1 |
| 2006/0075422 | A1 * | 4/2006 | Choi et al. ................. 725/18 |
| 2007/0120971 | A1 * | 5/2007 | Kennedy ................. 348/14.16 |

* cited by examiner

*Primary Examiner*—Matthew C Bella
*Assistant Examiner*—Shervin Nakhjavan
(74) *Attorney, Agent, or Firm*—Jianq Chyun IP Office

(57) ABSTRACT

A method of tracking a vocal target is disclosed. An image-capturing device is employed to capture an image including the participating targets. Next, an image tracking method is used to determine the image regions where the participating targets are respectively located. The found image regions are compared with the vocal regions of each vocal targets detected by a sound-detecting device. Thus, the positions where the vocal targets are located are precisely detected. Thus, cost of the video system can be effectively reduced and the video image resolution can be effectively promoted.

10 Claims, 5 Drawing Sheets

| FEATURE | x | y | WIDTH | HEIGHT | THRESHOLD VALUE |
|---|---|---|---|---|---|
| 1.(a) | 24 | 63 | 12 | 12 | 0.124 |
| 2.(b) | 44 | 65 | 26 | 13 | 1.357 |
| 1.(d) | 1 | 34 | 12 | 25 | 0.024 |
| 3.(a) | 56 | 65 | 3 | 5 | −0.2352 |
| ... | | | | | |
| ... | | | | | |
| ... | | | | | |
FIG. 5
1. EDGE FEATURE
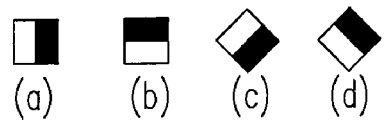
(a)　(b)　(c)　(d)
2. LINE FEATURE
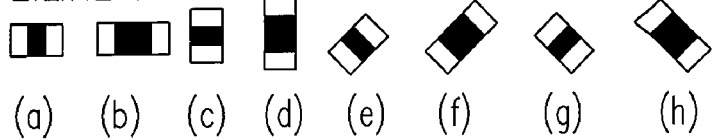
(a)　(b)　(c)　(d)　(e)　(f)　(g)　(h)
3. CENTER-SURROUNDING FEATURE
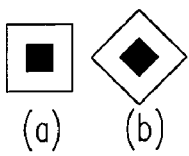
(a)　(b)
FIG. 6

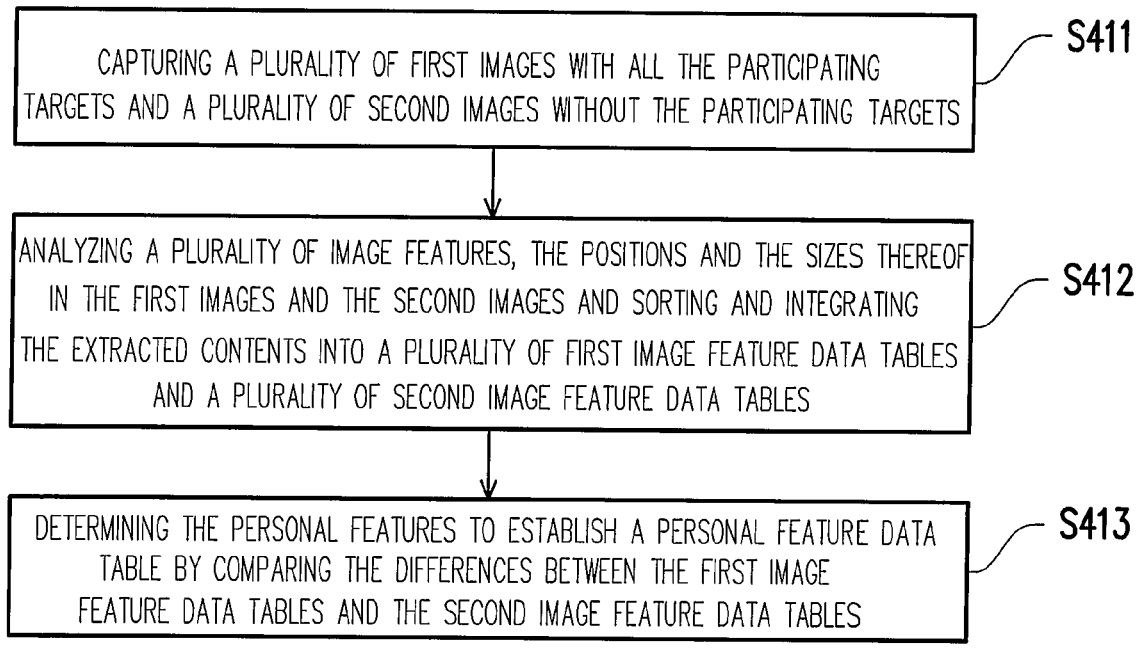

S411 CAPTURING A PLURALITY OF FIRST IMAGES WITH ALL THE PARTICIPATING TARGETS AND A PLURALITY OF SECOND IMAGES WITHOUT THE PARTICIPATING TARGETS

S412 ANALYZING A PLURALITY OF IMAGE FEATURES, THE POSITIONS AND THE SIZES THEREOF IN THE FIRST IMAGES AND THE SECOND IMAGES AND SORTING AND INTEGRATING THE EXTRACTED CONTENTS INTO A PLURALITY OF FIRST IMAGE FEATURE DATA TABLES AND A PLURALITY OF SECOND IMAGE FEATURE DATA TABLES

S413 DETERMINING THE PERSONAL FEATURES TO ESTABLISH A PERSONAL FEATURE DATA TABLE BY COMPARING THE DIFFERENCES BETWEEN THE FIRST IMAGE FEATURE DATA TABLES AND THE SECOND IMAGE FEATURE DATA TABLES

FIG. 7

| FEATURE | x | y | WIDTH | HEIGHT |
|---|---|---|---|---|
| 1.(a) | 10 | 12 | 20 | 20 |
| 2.(b) | 70 | 10 | 40 | 40 |
| 1.(d) | 32 | 45 | 22 | 5 |
| 3.(a) | 54 | 77 | 36 | 7 |
| ... | | | | |
| ... | | | | |
| ... | | | | |

FIG. 8

# METHOD OF TRACKING VOCAL TARGET

CROSS-REFERENCE TO RELATED APPLICATION

This application claims the priority benefit of Taiwan application serial no. 95125201, filed Jul. 11, 2006. All disclosure of the Taiwan application is incorporated herein by reference.

BACKGROUND OF THE INVENTION

1. Field of the Invention

The present invention generally relates to a method of tracking a target, and more particularly, to a method of tracking a vocal target combining voice detection and image recognition.

2. Description of Related Art

Along with the internet popularization, various technologies used in the internet are accordingly updated day by day, wherein in addition to the basic functions, such as browsing web pages or receiving and sending emails, some novel functions of transmitting multimedia files through the internet are further developed, for example, transmitting pictures, music or video frames. Furthermore, thanks to an increasing internet bandwidth, the internet connection speed has increased by two folds as well, so that the expected circumstance of real-time video delivery on internet can be realized.

The recently launched video meeting system is counted as one of such remarkable applications, where a user disposes an image-capturing device and a sound-detecting device at the calling end and then is able to real-time transmit video images and voice to the receiving end through the internet, meanwhile the user is able to receive video data from the receiving end too, so that the effect of a bidirectional real-time conversation can be achieved. In terms of capturing video images, the newly provided method further includes detecting the position of a speaker in a meeting by using unidirectional microphones, followed by adjusting the lens direction of an image-capturing device to capture the close-up image of the speaker, so that the personal image is zoomed-in and the resolution of the close-up image is enhanced. In this way, the expressions and the actions of the speaker can be more clearly watched at the receiving end, which further advances the practicability of a video meeting.

FIG. 1 is a diagram where three unidirectional microphones are used for adjusting a lens to capture the image of a speaker in the prior art. Referring to FIG. 1, there are three meeting attendees 100, 120 and 130 in the video meeting, and in fronts of all the meeting attendees a unidirectional microphone is respectively allocated. Whenever a meeting attendee is speaking, the unidirectional microphone in the front thereof would automatically reveal the position of the speaker and provides an image-capturing device with the position, so as to adjust the lens direction thereof and the resolution for capturing the image of the speaker. Although the position of the speaker can be precisely detected in the above-mentioned manner, however it also requires to respectively dispose a unidirectional microphone for each meeting attendee; therefore the conventional scheme cost is high.

FIG. 2 is a diagram where two unidirectional microphones are used for adjusting a lens to capture the image of a speaker in the prior art. Referring to FIG. 2, there are still three meeting attendees 100, 120 and 130 in the video meeting, while only two unidirectional microphones 140 and 150 are disposed to detect the positions of speakers. As shown by FIG. 2, the unidirectional microphone 140 has a certain detection range (between A and B) and the detection range covers the meeting attendees 110 and 120, hence, when the attendee 110 is speaking, the unidirectional microphone 140 can reveal the attendee 110 and accordingly adjust the lens direction of an image-capturing device 160 to aim the center point C of the detection range. However, the position of the center point C is not the real position of the attended 110, which causes an error of the captured image and what the user can do at the point to obtain the complete image of the attended 110 is to zoom-out the lens to get a larger captured image range. It can be seen therefrom that the above-mentioned scheme is unable to precisely detect the positions of meeting attendees; and to get a complete attendee image, the resolution must be reduced to cover a larger image, which would limit the practicability of a video meeting.

SUMMARY OF THE INVENTION

Accordingly, the present invention is to provide a method of tracking a vocal target by searching the participating targets and using a sound-detection device to detect the position/location of a vocal target.

The present invention provides a method of tracking a vocal target, which is suitable for tracking the target region of at least a vocal target among a plurality of participating targets. The method includes the following steps. First, an image is captured by using an image-capturing device, wherein all participating targets are included in the image. Next, the image regions of all the participating targets in the image are located by using an image tracking method. Next, the vocal regions in the image corresponding to the vocal targets are obtained by using at least a sound-detecting device to detect vocal targets. Finally, the distances between each the vocal region and all the image regions in the image are calculated and then the image region with the shortest distance is taken as the target region the vocal target located.

According to a preferred embodiment of the present invention, the method further includes a step of adjusting the focal length of the lens of the image-capturing device to zoom-out the lens and get a larger target region. When the vocal target is moving, the target region the vocal target located would be tracked continuously.

According to a preferred embodiment of the present invention, the method further includes a step of judging whether a plurality of vocal targets is revealed by the sound-detecting device, wherein if the result from the judgment is 'yes', the vocal regions where the vocal targets are located would be matched with each image region to determine the image regions with the closest distances from the vocal regions and the middle region of the revealed image regions is taken as the target region where the vocal targets are located.

According to a preferred embodiment of the present invention, the method of tracking an image includes the following steps. First, a personal feature data table is established, which includes a plurality of personal features and the positions and the sizes thereof. Next, the image is analyzed to derive an image feature data table, which includes a plurality of image features and the positions and the sizes thereof. Finally, the image feature data table are compared with the personal feature data table to obtain the image regions where each of the participating targets are located.

According to a preferred embodiment of the present invention, the step of comparing the image feature data tables with the personal feature data table includes the following steps. First, the image features in the image feature data table are compared with the personal features of the corresponding positions in the personal feature data table. Next, a comparison value between each pair of an image feature and the corresponding personal feature is calculated. Next, whether each of the comparison values is greater than a threshold value of the personal feature is judged, wherein when the comparison value is greater than the threshold value, the image feature would be decided as one of the personal features.

According to a preferred embodiment of the present invention, the step of establishing the personal feature data table includes the following steps. First, a plurality of first images with the participating targets and a plurality of second images without the participating targets are captured. Next, the first images and the second images are analyzed and a plurality of first image feature data tables and a plurality of second image feature data tables are derived. Finally, the personal features are found and the personal feature data table is established according to the differences between each image feature in the first image feature data tables and the corresponding image feature in the second image feature data tables.

According to a preferred embodiment of the present invention, the above-mentioned personal feature or image feature includes edge feature, line feature and center-surrounding feature.

According to a preferred embodiment of the present invention, the above-mentioned image-capturing device includes a charge-coupled device video camera (CCD video camera) or a complementary metal oxide semiconductor video camera (CMOS video camera).

According to a preferred embodiment of the present invention, the above-mentioned sound-detecting device includes a unidirectional microphone.

In short, the present invention adopts a structure including an image-capturing device and a sound-detecting device/sound-detecting devices, captures images of a plurality of participating targets and then determines the positions where each of the participating targets are located by using image-tracking. Finally, the positions are matched with the vocal target/the vocal targets revealed by the sound-detecting device, so that the goal of precisely detecting the position of a vocal target can be achieved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic personal feature data table according to the preferred embodiment of the present invention.

FIG. 6 is a diagram showing the types of image features according to the preferred embodiment of the present invention.

FIG. 7 is a flowchart illustrating a method for establishing a personal feature data table according to the preferred embodiment of the present invention.

FIG. 8 is schematic image feature data tables according to the preferred embodiment of the present invention.

DESCRIPTION OF THE EMBODIMENTS

In order to make the contents of the present invention more explicit, the following embodiment is described for exemplary purpose to confirm the feasibility of the present invention only.

In a video conference, an image-capturing device (for example, a video camera) is used to capture the images of meeting attendees in addition to a microphone used to detect sound. The images usually include the images of all the meeting attendees, wherein if an image recognition method can be used to identify the image regions where each of the meeting attendees are located, the real positions of all the attendees can be obtained. In the following, according to the above-mentioned principle an embodiment is cited to explain the detail steps of the method of tracking a vocal target provided by the present invention.

Figure 1:
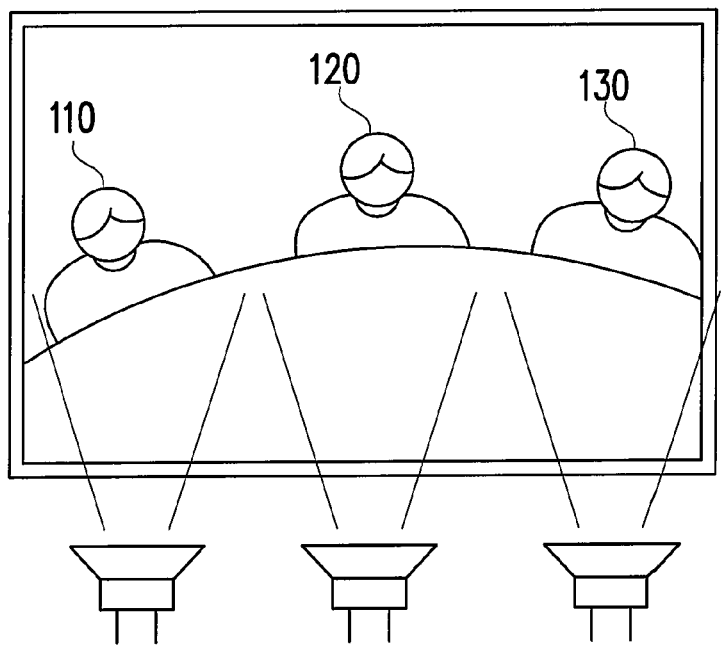
FIG. 1 is a diagram showing three unidirectional microphones used for adjusting a lens to capture the image of a speaker in the prior art.
Figure 2:
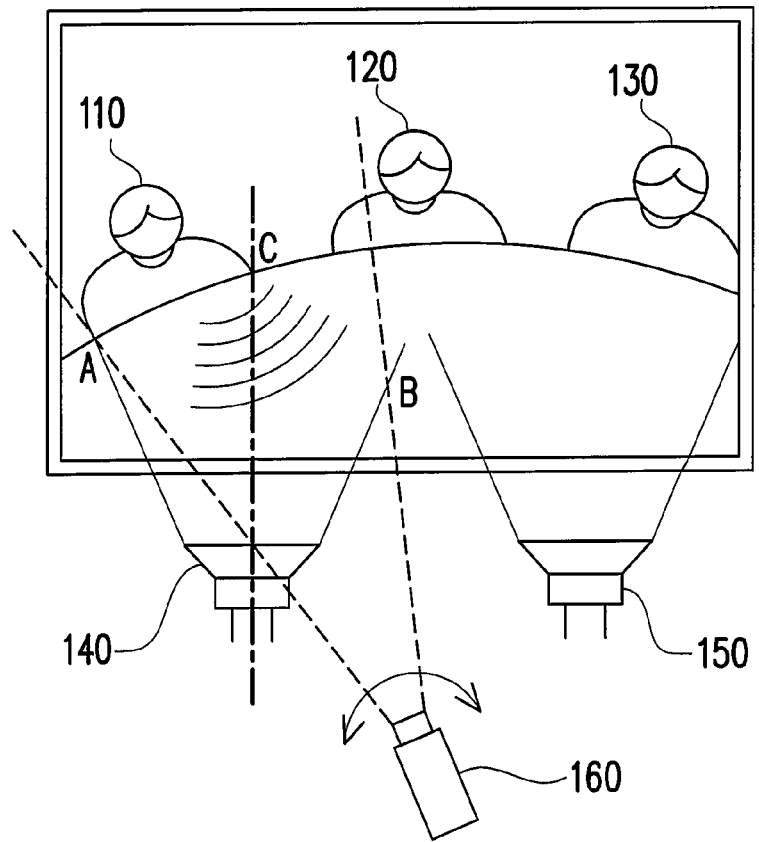
FIG. 2 is a diagram showing two unidirectional microphones used for adjusting a lens to capture the image of a speaker in the prior art.
Figure 3:
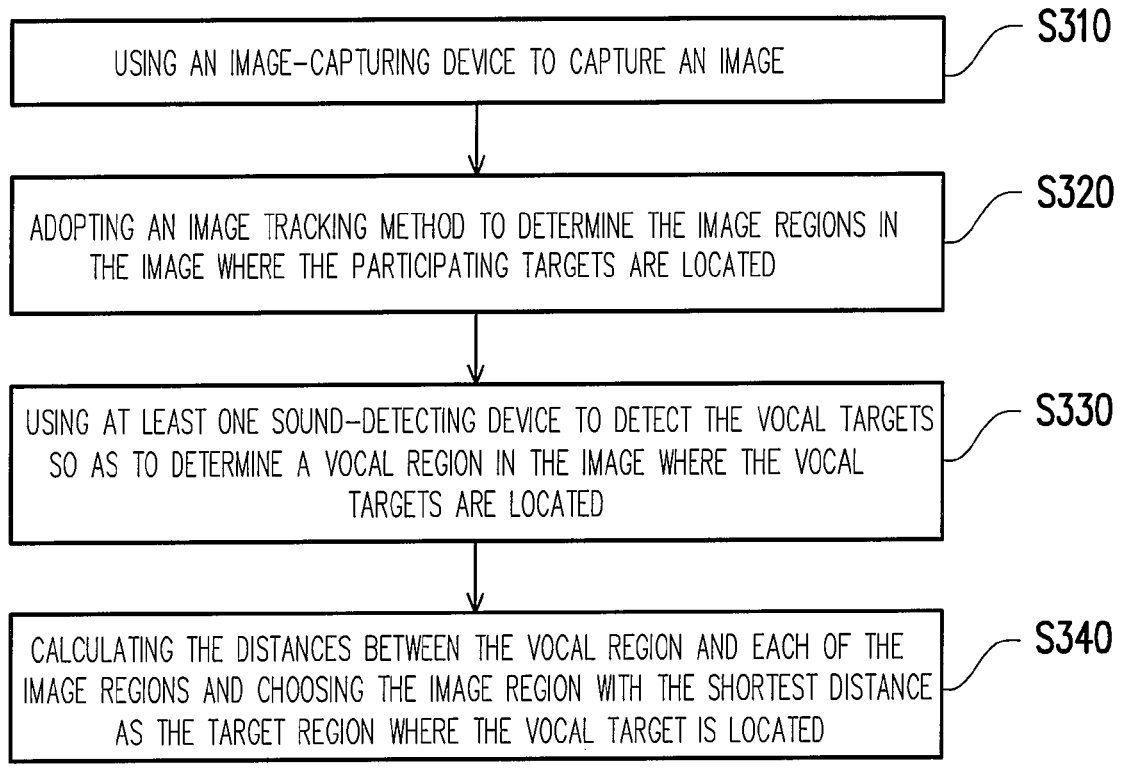
FIG. 3 is a flowchart illustrating a method for tracking a vocal target according to the preferred embodiment of the present invention.

FIG. 3 is a flowchart illustrating a method for tracking a vocal target according to the preferred embodiment of the present invention. Referring to FIG. 3, the target region where at least a vocal target among a plurality of participating targets is located is tracked. The participating targets include, for example, meeting attendees or objects for exhibition. In the following, a practical operation flow of a video conference is taken as an example to describe how the position of at least a speaker is tracked out from a plurality of meeting attendees according to the present invention.

In the beginning of a video conference, first, the focal length of the lens of an image-capturing device is adjusted to capture an image of the meeting, which covers all the meeting attendees (step S310). The image-capturing device includes, for example, a common charge-coupled device video camera (CCD video camera) or a complementary metal oxide semiconductor video camera (CMOS video camera).

Next, an image tracking method is used to locate the image regions of the attendees from the above-mentioned captured images (step S320). The method of tracking an image includes, for example, matching a plurality of image features in the images with the personal features in a pre-established personal feature data table to locate the image regions where each of the meeting attendees are located.

After determining the image regions of the meeting attendees, a sound-detecting device is used to detect the sound of a speaker and then identify the vocal regions in the images corresponding to the speaker (step S330). The so-called sound-detecting device includes, for example but not limited to, a unidirectional microphone.

After determining the image regions and the vocal regions, the distances between the image regions and the vocal regions in the captured images are calculated and the image region with the shortest distance is chosen as the target region where the speaker is located (step S340).

Next, the focal length of the lens of the image-capturing device is adjusted to zoom-in the image of the target region for providing the remote meeting attendees with a clearer image. If the speaker in the target region is moving at the point (for example, standing up to present projection slides), the target region of the speaker is continuously tracked such that other attendees could continuously see the actions or the facial expression of the speaker.

In fact, in a video conference, a plurality of meeting attendees may simultaneously address. In such a case, whether or not a plurality of speakers are simultaneously detected by the sound-detecting device may be judged. If a plurality of speakers are detected, the vocal regions where the speakers are located would be similarly matched with the image regions where the attendees are located to determine the image regions with the closest distances from the vocal regions, and the middle region of the located image regions is taken as the target region of the speakers. For example, if two speakers are revealed, then, the two image regions respectively with the closest distance from each of the two speakers would be determined from the captured images, and then the middle region of the two image regions may be chosen as the target region of the speakers.

In the above-mentioned step S320, a method for tracking an image is used to locate the image regions of each of the meeting attendees. The step includes matching a plurality of image features in the captured images with the personal features in a pre-established personal feature data table to determine the image regions of the meeting attendees. In the following, the steps of tracking an image are described in detail.

Figure 4:
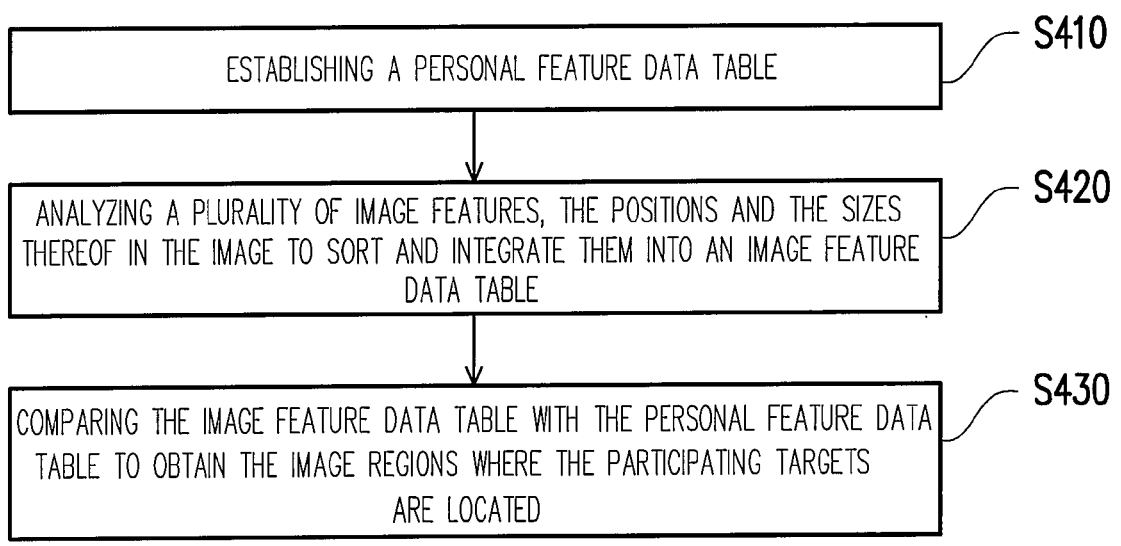
FIG. 4 is a flowchart illustrating a method for tracking an image according to the preferred embodiment of the present invention.

FIG. 4 is a flowchart of a method for tracking an image according to the preferred embodiment of the present invention. Referring to FIG. 4, in order to determine whether an image contains personal features, first, a personal feature data table needs to be established (as shown by FIG. 5), wherein the table includes the type of personal features (for example, 1.(a) in FIG. 5), the position of the feature (x,y) and the size of the feature (width and height) (step S410).

After establishing the personal feature data table, the captured images are analyzed in the same way so as to extract a plurality of image features and the positions and sizes thereof, and integrate the extracted contents into an image feature data table (step S420). FIG. 6 is a diagram illustrating the types of image features according to the preferred embodiment of the present invention. Referring to FIG. 6, the above-mentioned personal features or image features include edge feature (for example, 1.(a)-(d)), line feature (for example, 2.(a)-(h)) and center-surrounding feature (for example, 3.(a) and (b)). The types of the features are shown in FIG. 6. Finally, the image feature data table is compared with the personal feature data table so as to obtain the image regions of each of the meeting attendees (step S430).

It should be noted that the above-mentioned step S410 of establishing a personal feature data table is accomplished through a plurality of sub-steps. FIG. 7 is a flowchart illustrating a method for establishing a personal feature data table according to the preferred embodiment of the present invention. Referring to FIG. 7, first, a plurality of first images with all meeting attendees and a plurality of second images without a meeting attendee are captured (step S411).

Next, a plurality of image features, and the positions and sizes thereof contained in the first images and the second images are analyzed, and then the extracted contents are sorted and integrated into a plurality of first image feature data tables and a plurality of second image feature data tables (an image is corresponding to a data table, as shown by FIG. 8) (step S412). Further, the first image feature data tables are compared with the second image feature data tables to obtain the differences, so as to search for personal features, and establish the personal feature data table (step S413).

The above-mentioned step S413 of comparing the first image feature data tables with the second image feature data tables includes the following sub-steps. First, a comparison value between each image feature and each corresponding personal feature is calculated (for example, a similarity is calculated). Next, the comparison value is compared with a threshold value (as shown in FIG. 5), wherein the threshold value is a statistic value obtained by the previously conducted experiments. If the comparison value is greater than the threshold value, the image feature is judged as one type of the personal features and the region where the image feature is located is judged as the image region where the participating target is located.

Next, the precise position of the speaker is obtained. Next, by zooming-out the image region where the speaker is located, a clear image can be provided for other attendees in the video conference, such that the quality of video frames is enhanced. In order to more explicitly express the above-mentioned scheme, the implementation of the method of tracking a vocal target of the present invention is described in more detail with reference to FIG. 9 in consideration of three situation namely no speaker, only one speaker and two speakers.

Figure 9:
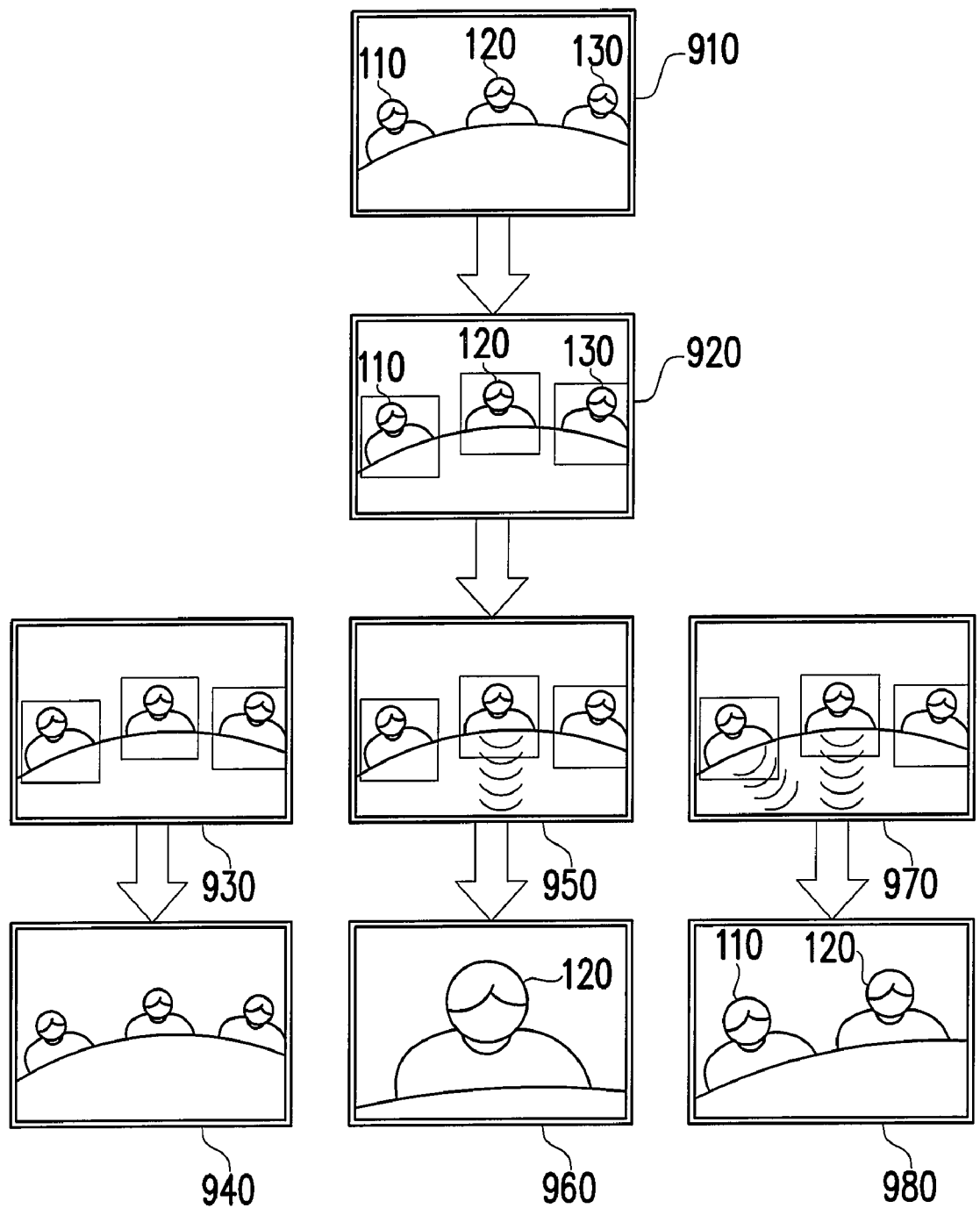
FIG. 9 is a diagram illustrating a method for tracking an image according to the preferred embodiment of the present invention.

FIG. 9 is a diagram showing the method of tracking an image according to a preferred embodiment of the present invention. Referring to FIG. 9, the image 910 is a first image photographed prior to starting a meeting but after all the meeting attendees, for example 110, 120 and 130 have seated. Next, by using the above-mentioned method of tracking an image, the image regions where the three attendees 110, 120 and 130 are located are calculated (as shown by three frames in the image 920).

During the meeting, once none of the three attendees is speaking, the middle region of the three image regions is taken as the target region relative to the positions of the image regions in the image 930 such that the lens of the image-capturing device is aimed at the middle position, and at this time, the focal length of the lens is adjusted to cover the three attendees 110, 120 and 130 to capture the image 940.

Once an attendee begins to speak (for example, the attendee 120), the image region where the attendee 120 is located is taken as the target region such that the lens of the image-capturing device is aimed at the target region, and at this time the focal length of the lens is adjusted to zoom-in the image region where the attendee 120 is located to obtain the image 960.

When two attendees are speaking (for example, the attendees 110 and 120), the middle region of the two image regions where the attendees 110 and 120 respectively are located in the image 970 is taken as the target region such that the lens of the image-capturing device is aimed at the target region and at this time the focal length of the lens is adjusted to zoom-in the image region where the attendees 110 and 120 are located to capture the image 980.

In summary, the present invention has at least the following advantages.

1. Instead of placing a sound-detecting device in front of each meeting attendee, the present invention employs a method of tracking a target so that the number of sound-detecting devices can be significantly reduced and thereby reduce cost.

2. By comparing the captured image regions and the detected vocal regions, the position of a speaker can be determined more precisely.

3. The focal length of the lens of the image-capturing device can be appropriately adjusted according to the number of meeting attendees, and the positions and the movement of the attendees without compromising with the resolution.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of tracking a vocal target, suitable for tracking a target region where at least a vocal target is located among a plurality of participating targets, the method comprising:
   using an image-capturing device to capture an image including the participating targets;
   using an image tracking method to determine a plurality of image regions in the image where the participating targets are located;
   using at least one sound-detecting device to detect the vocal targets so as to determine a vocal region in the image where the vocal targets are located; and
   calculating the distances between the vocal region and each of the image regions and choosing the image region with the shortest distance as the target region where the vocal target is located.

2. The method of tracking a vocal target according to claim 1, further comprising a step of adjusting a focal length of the lens of the image-capturing device to zoom-in the image of the target region.

3. The method of tracking a vocal target according to claim 2, further comprising a step of continuously tracking the target region where the vocal target is located when the vocal target is moving.

4. The method of tracking a vocal target according to claim 1, further comprising a step of judging whether or not the sound-detecting device has detected a plurality of vocal targets, wherein if a plurality of vocal targets are detected, the vocal regions where the vocal targets are located are compared with the image regions to determine the image regions with closest distances from the vocal regions and a middle region relative to the image regions is taken as the target region.

5. The method of tracking a vocal target according to claim 1, wherein the step of tracking an image comprises:
   establishing a personal feature data table including a plurality of personal features, and positions and sizes thereof;
   analyzing the image to sort and integrate an image feature data table including a plurality of image features, and positions and sizes thereof; and
   comparing the image feature data table with the personal feature data table to obtain the image regions where the participating targets are located.

6. The method of tracking a vocal target according to claim 5, wherein the step of comparing the image feature data table with the personal feature data table comprises:
   comparing the image features in the image feature data table with the personal features in the personal feature data table and calculating comparison values between the image features and the corresponding personal features; and
   judging whether or not the comparison values are respectively greater than a threshold value of the personal feature, wherein if the comparison value is greater than the threshold value, the image feature is judged as one of the personal features and the region where the image feature is located is judged as the image region where the participating targets are located.

7. The method of tracking a vocal target according to claim 5, wherein the step of establishing the personal feature data table comprises:
   capturing a plurality of first images with the participating targets and a plurality of second images without the participating targets;
   analyzing the first images and the second images, and sorting and integrating extracted contents into a plurality of first image feature data tables and a plurality of second image feature data tables, wherein each table comprises a plurality of image features, and positions and sizes thereof; and
   determining the personal features according to the differences between the image features in the first image feature data tables and the image features in the second image feature data tables and then establishing the personal feature data table.

8. The method of tracking a vocal target according to claim 5, wherein the personal features or the image features comprise edge feature, line feature and center-surrounding feature.

9. The method of tracking a vocal target according to claim 1, wherein the image-capturing device comprises a charge-coupled device (CCD) video camera or a complementary metal oxide semiconductor (CMOS) video camera.

10. The method of tracking a vocal target according to claim 1, wherein the sound-detecting device comprises a unidirectional microphone.

* * * * *